UNITED STATES PATENT OFFICE.

EGBERT CORNELIS SUTHERLAND, OF DEVENTER, NETHERLANDS, ASSIGNOR TO NAAMLOOZE VENNOOTSCHAP INDUSTRIEELE MAATSCHAPPIJ VOORHEEN NOURY & VAN DER LANDE, OF DEVENTER, NETHERLANDS, A CORPORATION OF THE NETHERLANDS.

PROCESS FOR TREATING MEAL OR FLOUR AND MILLING PRODUCTS.

1,381,079.   Specification of Letters Patent.   Patented June 7, 1921.

No Drawing.   Application filed March 25, 1918. Serial No. 224,680.

*To all whom it may concern:*

Be it known that I, EGBERT CORNELIS SUTHERLAND, chemist, residing at Deventer, No. 60 Worp, the Netherlands, have invented certain new and useful Improvements in and Relating to Processes for Treating Meal or Flour and Milling Products, of which the following is a specification.

In my copending patent application No. 136,551, I have shown how to improve the color, baking qualities and the durability of meal or flour and milling products. According to the process therein described, the meal or flour is mixed with one or more true peroxids or peroxidized compounds which subsequently are decomposed by chemical or physical agents, yielding active oxygen. The term "true peroxids" in the prior case, as well as in the present application, includes those inorganic or organic peroxids which can be considered as being derived from peroxid of hydrogen. The expression, therefore, does not include such compounds as dioxid of nitrogen. An example of the process of said application consists in adding to a quantity of the flour, 0.02% of $H_2O_2$ (or an equivalent amount of one of the compounds of $H_2O_2$), then spreading out the mixture, as on a belt conveyer, and carrying the same through a treating chamber under one or more mercury vapor lamps, emitting ultra-violet light, which light causes the decomposition of the peroxid or peroxid compound with the liberation of nascent oxygen which thus is allowed to act directly upon the flour, to improve its properties.

The process, according to my patent application No. 136,551, when applied to some milling products, appeared to give a negative or a very unsatisfactory result. Now I have found that this is probably due to the fact that certain enzyms are present in these milling products, which enzyms render the peroxid or peroxidized compounds inactive and impede the formation of active oxygen therefrom.

I have further found that this unfavorable action can be neutralized by adding a substance containing active chlorin or a small quantity of free chlorin to said milling product before it is treated with the peroxidized compounds.

A substance containing active chlorin is one that yields chlorin in the presence of moisture or weak acids (or both) at ordinary or slightly increased temperatures.

As active chlorin-containing substances, I use *e. g.*, chlorid of lime (*i. e.*, bleaching powder, which material contains calcium hypochlorite) but I do not limit myself either to the use of special representatives of the groups of compounds mentioned, nor to a special form in which they are added to the product. It should further be understood that mixtures of suitable active chlorin-containing substances are intended to be covered by my claims.

By using small quantities of free chlorin or small quantities of an active chlorin-containing substance the effect of the peroxid is sooner noticeable and the result is more efficient than by using peroxid only.

The process of my present invention renders it possible to obtain from different kinds of meal (as *e. g.* potato flour, rice flour, starch, manioc roots and others, which according to my former process mentioned above give less favorable results) products that possess excellent qualities.

Moreover this process can be applied to meals that are rendered wholly or partially soluble or dextrinized as well as to dextrin itself.

As a specific example of the process, the flour may be first allowed to fall through a chamber containing air mixed with a small amount (say 0.1% or so by weight) of chlorin gas, for example by being sifted into the upper part of a tower through which such an atmosphere is caused to slowly rise.

The bulk of air passing through the tower per unit of time, relative to the amount of flour being treated in such unit of time, may be so adjusted that the total amount of chlorin is from one to three one-thousandths of a per cent., figured on the weight of flour. Such an amount of chlorin is not to be confused with bleaching processes heretofore proposed in which it has been proposed to treat flour with enough chlorin to bleach said flour by the destruction of certain of the colored substances therein.

After the chlorin treatment, the above stated quantity of hydrogen peroxid is added to the flour, and the same then treated with ultra-violet light by the means above described. This example is merely one of many by which the treatment may be applied, and the invention is not restricted to this specific example.

It has been suggested already to use chlorin for bleaching flour or meal, but with my process the addition of chlorin aims only at treatment with an amount of chlorin capable of rendering the enzyms inactive, the addition taking place previous to the bleaching action of the peroxid. The quantity of chlorin required is therefore exceedingly small.

It has further been suggested to use a mixture of chlorid of nitrosyl and chlorin for the bleaching of meal. The chlorid of nitrosyl, however, does not act as a substance containing active chlorin, but is, under the influence of the moisture contained in the meal, decomposed into $NO_2$ and $HCl$, the former compound assisting the bleaching power of the mixture of chlorid of nitrosyl and chlorin. So here also the chlorin-containing substance serves only the purpose of bleaching the meal, and it is not its ability to produce free chlorin but its capacity of supplying $NO_2$ which determines its value.

In contradistinction to these well-known processes the bleaching proper, according to the process of the present application, is (as appears from the above) affected by the nascent oxygen produced from one or more peroxids, and not by the chlorin. In my present process, the free chlorin which acts on the meal has no other effect than to render the enzyms in the meal inactive, and this is true whether the chlorin is added in the free state or in the form of a compound, e. g. bleaching powder.

Even small quantities of chlorin can give this result so that in contradistinction to the above mentioned process an addition of one or a few thousandths of a per cent. (by weight) will be sufficient. It is even advisable to use as little as possible of hypochlorites and free chlorin since these substances have a decomposing effect on peroxid, so that the effect of an excess would be the action of free chlorin on alkaline peroxid, which would produce oxygen in molecular form, which does not bleach the meal. Hence the use of an excess of chlorin would cause a loss of available peroxid.

By using too much free chlorin or active chlorin containing substance the meal also would obtain an unpleasant smell, which even after a long time does not entirely disappear. Small quantities of chlorin, however, are easily converted by the peroxid into non-injurious compounds, so that after completing the entire treatment no active or free chlorin is to be found in the meal, and the smell and flavor of the meal are normal.

Having thus described my invention, what I claim as new and desire to secure by Letters Patent is:—

1. In the process for treating flour, meal and milling products with a peroxidized compound, the improvement which comprises adding to the material under treatment a small amount of a substance capable of producing active chlorin, thereafter mixing the product with a peroxidized compound, and finally decomposing the latter.

2. In the process of treating flour, meal and other milling products, the improvement which comprises subjecting the said material to the action of chlorin in amount sufficient to react upon the enzyms present, thereafter treating such material with a peroxid compound, and finally subjecting the mass to conditions capable of decomposing said peroxid compound.

3. A process of bleaching and improving the properties of milling products which comprises the successive steps of:—(a) treating the said products with chlorin, (b) then treating the same with a peroxid compound capable of liberating nascent oxygen, and finally (c) subjecting the product to the action of a physical agency capable of liberating nascent oxygen from the said peroxid compound.

4. A process of bleaching and improving the properties of milling products which comprises the successive steps of:—(a) treating the said products with an amount of chlorin insufficient to bleach the said products, (b) then treating the same with a peroxid compound capable of liberating nascent oxygen, (c) then decomposing the peroxid compound.

5. A process of bleaching and improving the properties of milling products which comprises the successive steps of:—(a) treating the said products with chlorin, (b) then treating the same with a peroxid compound capable of liberating nascent oxygen, and finally (c) subjecting the product to the action of ultra-violet light.

In testimony whereof I affix my signature in presence of two witnesses.

EGBERT CORNELIS SUTHERLAND.

Witnesses:
H. Y. KOOP,
PLANTE FILMER.